United States Patent
Matsuda

(10) Patent No.: US 7,830,544 B2
(45) Date of Patent: Nov. 9, 2010

(54) IMAGE PROCESSING APPARATUS, IMAGE PROCESSING METHOD, IMAGE PROCESSING PROGRAM AND RECORDING MEDIUM

(75) Inventor: Hideyuki Matsuda, Suita (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1094 days.

(21) Appl. No.: 11/237,717

(22) Filed: Sep. 29, 2005

(65) Prior Publication Data
US 2006/0222253 A1    Oct. 5, 2006

(30) Foreign Application Priority Data
Mar. 29, 2005    (JP) ............... 2005-094103

(51) Int. Cl.
G06F 3/12    (2006.01)
(52) U.S. Cl. .............. 358/1.18; 358/1.11; 358/1.13; 358/1.15; 358/452; 358/453
(58) Field of Classification Search ....... 358/1.11–1.15, 358/1.18, 452, 453
See application file for complete search history.

(56) References Cited

U.S. PATENT DOCUMENTS

| 2002/0006234 A1* | 1/2002 | Horiuchi | 382/295 |
| 2002/0063681 A1* | 5/2002 | Lan et al. | 345/156 |
| 2004/0085578 A1* | 5/2004 | Quek et al. | 358/1.18 |
| 2005/0088701 A1* | 4/2005 | Uchida et al. | 358/3.28 |
| 2005/0141015 A1* | 6/2005 | Fusayuki | 358/1.14 |
| 2006/0017946 A1* | 1/2006 | Peiro et al. | 358/1.11 |
| 2006/0285152 A1* | 12/2006 | Skillen | 358/1.15 |

FOREIGN PATENT DOCUMENTS

| JP | 07-089215 | 4/1995 |
| JP | 3079230 | 5/2001 |
| JP | 2002-016785 | 1/2002 |
| JP | 2003-229978 | 8/2003 |
| JP | 2003-304352 | 10/2003 |
| JP | 2003-333224 | 11/2003 |
| JP | 2004-304597 | 10/2004 |

OTHER PUBLICATIONS

Japanese Preliminary Notice of Rejection dated Jan. 16, 2007, directed to counterpart JP application No. 2005-094103.

* cited by examiner

*Primary Examiner*—Chan S Park
(74) *Attorney, Agent, or Firm*—Morrison & Foerster LLP

(57) ABSTRACT

An image processing apparatus which creates and delivers an image file whose layer can be managed comprises a first image data acquisition unit which acquires first image data, a second image data acquisition unit which acquires second image data, receiving unit for receiving a delivery destination of the created image file, a determination unit which determines whether the first image data and the second image data are stored in the same layer or the different layers, depending on the delivery destination received by the receiving unit, an image file creation unit which creates the image file in which the first image data and the second image data are stored in the same layer or the different layers, based on a result of the determination of the determination unit, and transmitting unit for transmitting the image file to the delivery destination received by the receiving unit.

18 Claims, 8 Drawing Sheets

IMAGE PROCESSING APPARATUS, IMAGE PROCESSING METHOD, IMAGE PROCESSING PROGRAM AND RECORDING MEDIUM

This application is based on Japanese Patent Application No. 2005-94103 filed in Japan on Mar. 29, 2005, the contents of which are hereby incorporated by reference.

BACKGROUND OF THE INVENTION

1. Field of the Invention

The present invention relates to an image processing apparatus which can create an image file having a layer management function in which a plurality of image data is managed in a plurality of layers.

2. Description of the Related Art

An image processing apparatus is connected to each section in a company or to a network established in the company so that it has been increasingly shared by a plurality of users as a MFP (Multi-Function Product) which performs scanning, faxing and mailing as well as printing.

Recently, it becomes important to provide security in such image processing apparatus connected to the network. For example, when image data (including an image of a document data) is printed to be used, there is a case where the limited number of copies is used because the data contains contents which should not be presented to anyone outside of the company. There is a technique in which tint block data is additionally and inconspicuously printed in such image data and when the image data is copied, the tint block data becomes clear so that it is known that the data is copied. For example, there is known a technique to print a shadow of a seal to be registered in registration certificate together with a tint block which becomes clear when it is copied (refer to Japanese Utility Model Registration No. 3079230, for example). In addition, there is known an anti-counterfeit printed material which is shown as a forgery when it is copied by a color-copying machine (refer to Japanese Patent Laid-open Publication No. 7-89215, for example).

In addition, there is known a technique which limits a total print copies of document data to be printed by the MFP in a delivery destination, to the number of copies intended by a document composer, as shown in Japanese Patent Laid-open Publication No. 2003-333224. Furthermore, there is known a method of registering an available application every user so as to limit it, as shown in Japanese Patent Laid-open Publication No. 2003-229978. Still further, there is known a technique in which a scan document scanned by the MFP is linked to security information for that document, as shown in Japanese Patent laid-open Publication No. 2003-304352.

However, as described above, when the image data and the tint block data are superimposed to one image file, the image data cannot be used alone. Meanwhile, when the image data and the tint block data are separately delivered, it could be illegally used by someone.

Meanwhile, there is a PDF file as an image file in which the image data and the tint block data can be contained in one image file, they can overlap with each other as an image at the time of printing, and only the image data can be retrieved and used according to need. The PDF file comprises at least one layer and when it comprises a plurality of layers, there is provided a layer management function which can overlap the layers to be one image. Therefore, creating the image file which can manage layers, such as the PDF file in which the image data and the tint block data are stored in the different layers, only the image data can be retrieved and edited when it is necessary. However, that image file is also available for anyone as described above, which could be a problem.

SUMMARY OF THE INVENTION

It is an object of the present invention to provide an image processing apparatus which creates an image file comprising an image data and a tint block data so that only a predetermined user can retrieve and edit the image data.

According to the present invention, an image processing apparatus which creates and delivers an image file whose layer can be managed, includes:

a first image data acquisition unit which acquires first image data;

a second image data acquisition unit which acquires second image data;

receiving unit for receiving a delivery destination of the created image file;

a determination unit which determines whether the first image data and the second image data are stored in the same layer or the different layers, depending on the delivery destination received by the receiving unit;

an image file creation unit which creates the image file in which the first image data and the second image data are stored in the same layer or the different layers, based on a result of the determination unit; and transmitting unit for transmitting the image file to the delivery destination received by the receiving unit.

In addition, the determination unit may determine whether the first image data and the second image data are stored in the same layer or in the different layers, depending on whether a user of the delivery destination received by the receiving unit is registered or not.

According to the present invention, an image processing apparatus which creates an image file whose layer can be managed, includes:

a first image data acquisition unit which acquires first image data;

a second image data acquisition unit which acquires second image data;

a determination unit which determines whether the first image data and the second image data are stored in the same layer or the different layers, depending on a user who gave an instruction to create the image file; and an image file creation unit which creates the image file in which the first image data and the second image data are stored in the same layer or the different layers, based on a result of the determination unit.

The image processing apparatus may further comprise an identification information input unit in which identification information of the user who gives the instruction to create the image file is inputted. In addition, the determination unit may determine whether the first image data and the second image data are stored in the same layer or the different layers, depending on whether the identification information inputted from the identification information input unit is user-registered or not.

In addition, the second image data can be tint block data. Thus, the image in which the image data overlaps with the tint block data can be printed. When the printed matter containing the tint block is copied, since the tint block becomes clear, it is difficult to use it as the printed matter which includes only the image data.

In addition, although the image file may comprise a PDF file, the present invention is not limited to the PDF file as long as the image file comprises the layer management function.

According to the present invention, an image processing method by which an image file whose layer can be managed is created and delivered, includes:
  acquiring first image data;
  acquiring second image data;
  receiving a delivery destination of the created image file;
  determining whether the first image data and the second image data are stored in the same layer or the different layers, depending on the delivery destination received by the receiving unit;
  creating the image file in which the first image data and the second image data are stored in the same layer or the different layers, based on a result of the determination, and
  transmitting the image file to the delivery destination received by the receiving unit.

In addition, according to the present invention, an image processing method by which an image file whose layer can be managed is created and delivered, includes:
  acquiring a first image data,
  acquiring a second image data,
  determining whether the first image data and the second image data are stored in the same layer or the different layers, depending on a user who gave an instruction to create the image file, and
  creating the image file in which the first image data and the second image data are stored in the same layer or the different layers, based on a result of the determination of the determination unit.

In addition, according to the present invention, an image processing program causes a computer to execute each step of the image file creating method by which an image file whose layer can be managed is created and delivered, including:
  acquiring first image data;
  acquiring second image data;
  receiving a delivery destination of the created image file;
  determining whether the first image data and the second image data are stored in the same layer or the different layers, depending on the delivery destination received by the receiving unit;
  creating the image file in which the first image data and the second image data are stored in the same layer or the different layers, based on a result of the determination; and
  transmitting the image file to the delivery destination received by the receiving unit.

Furthermore, according to the present invention, a recording medium, readable by a computer, which stores the image processing program for causing a computer to execute each step of the image processing method by which an image file whose layer can be managed is created and delivered, comprising:
  acquiring first image data;
  acquiring second image data;
  receiving a delivery destination of the created image file;
  determining whether the first image data and the second image data are stored in the same layer or the different layers, depending on the delivery destination received by the receiving unit;
  creating the image file in which the first image data and the second image data are stored in the same layer or the different layers, based on a result of the determination; and
  transmitting the image file to the delivery destination received by the receiving unit.

In addition, according to the present invention, an image processing program causes a computer to execute each step of the image processing method by which an image file whose layer can be managed is created and delivered, including:
  acquiring first image data;
  acquiring second image data;
  determining whether the first image data and the second image data are stored in the same layer or the different layers, depending on a user who gave an instruction to create the image file; and
  creating the image file in which the first image data and the second image data are stored in the same layer or the different layers, based on a result of the determination of the determination unit.

Furthermore, according to the present invention, a recording medium, readable by a computer, which stores the image processing program for causing a computer to execute each step of the image processing method by which an image file whose layer can be managed is created and delivered, including:
  acquiring first image data;
  acquiring second image data;
  determining whether the first image data and the second image data are stored in the same layer or the different layers, depending on a user who gave an instruction to create the image file; and
  creating the image file in which the first image data and the second image data are stored in the same layer or the different layers, based on a result of the determination of the determination unit.

According to the image processing apparatus of the present invention, the image file in which the first image data and the second image data are stored in the different layers is created, or the image file in which the first image data and the second image data are stored in the same layer is creased, depending on the delivery destination user. Thus, when the delivery destination user is the registered user, only the first image data can be retrieved from the image file and edited. Meanwhile, when the user is not the registered user, since the first image data and the second image data are stored in the same layer, the first image data cannot be retrieved alone and edited. Thus, the user who can treat only the first image data is limited.

BRIEF DESCRIPTION OF THE DRAWINGS

The present invention will become readily understood from the following description of preferred embodiments thereof made with reference to the accompanying drawings, in which like parts are designated by like reference numeral and in which.

DESCRIPTION OF THE PREFERRED EMBODIMENTS

Figure 1:
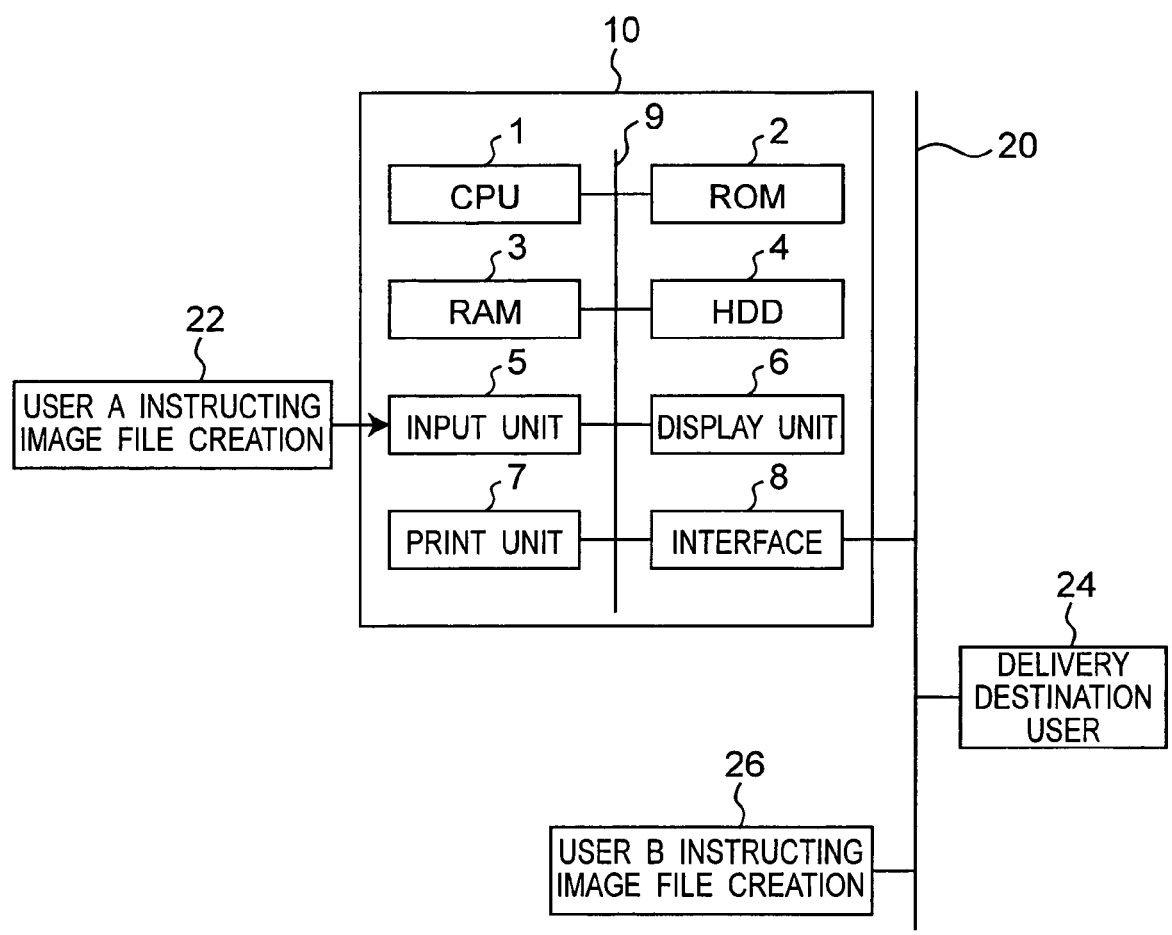
FIG. 1 is a block diagram showing a hardware constitution of an image processing apparatus according to an embodiment 1 of the present invention.

An image processing apparatus according to embodiments of the present invention will be described with reference to the accompanying drawings. In addition, the same reference numerals and signs are allotted to substantially the same member in the drawings.

Embodiment 1

FIG. 1 is a block diagram showing a hardware constitution of an image processing apparatus according to an embodiment 1 of the present invention. The image processing apparatus 10 includes a CPU 1, a ROM 2, a RAM 3, a HDD 4, an input unit 5, a display unit 6, a print unit 7, an interface 8 and a bus 9. In addition, the image processing apparatus 10 is connected to a network 20, and an image file creation instructing user A 22 directly instructs the image processing apparatus 10 to create an image file of an image in which the image file overlaps with tint block data and to deliver it to a delivery destination user 24 through the network 20. In addition, as will be described in a description of an embodiment 2 below, an image file creation instructing user B 26 instructs the image processing apparatus 10 to create an image file in which the image file overlaps with tint block data through the network 20. The image file created here comprises at least one layer, and when the image file comprises a plurality of layers, it is characterized by providing a layer management function which can form one image by laminating the layers. An example of such an image file is a PDF file.

Figure 2:
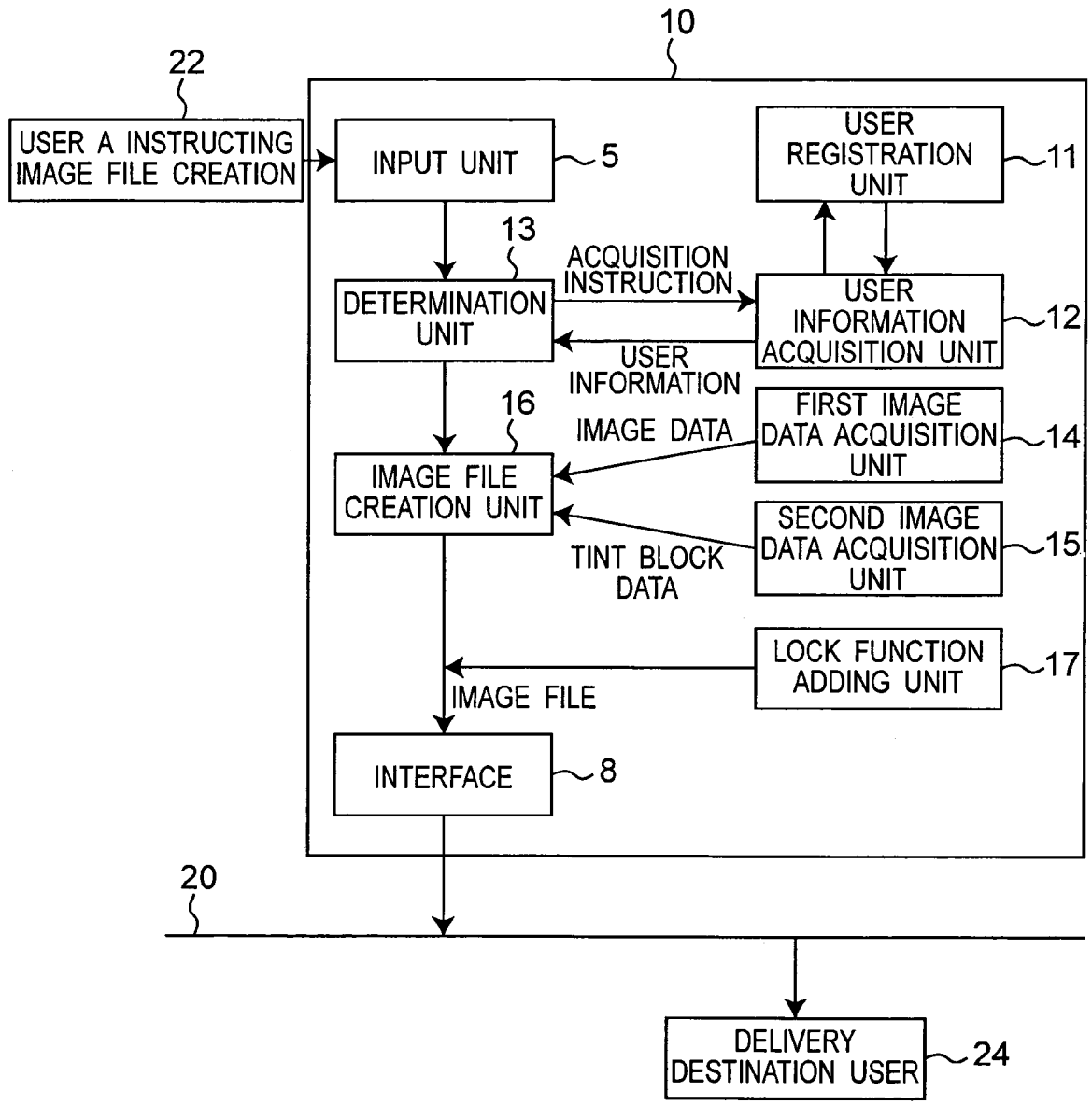
FIG. 2 is a block diagram showing a functional constitution of the image processing apparatus according to the embodiment 1 of the present invention.

FIG. 2 is a block diagram showing a functional constitution of the image processing apparatus 10. The image processing apparatus 10 comprises an input unit 5, a user registration unit 11, a user information acquisition unit 12, a determination unit 13, a first image data acquisition unit 14, a second image data acquisition unit 15, an image file creation unit 16, a lock function adding unit 17, and an interface 8. An instruction to create the image file from a user 22 is received by the input unit 5. The user registration unit 11 registers users who can retrieve only the image file from a PDF file and edit it. The determination unit 13 determines whether image data 32 and tint block data 34 are stored in the different layers or the same layer, depending on whether a delivery destination user 24 is a registered user or not. The first image data acquisition unit 14 acquires the image data from the user 22 as first image data. The second image data acquisition unit 15 acquires image data to be superimposed such as the tint block data, for example as second image data. The image file creation unit 16 creates image files 30 and 30a in which the image data 32 and the tint block data 34 are stored in the different layers and in the same layer, respectively, depending on a determined result in the determination unit 13. The lock function adding unit 17 adds a lock function to the PDF file. In addition, the "lock function" requires that a password be inputted at the time of an operation such as editing or printing of the PDF file and permits the file operation under the condition that the password coincides with a previously registered password. The interface 8 is connected to the network 20.

The image processing apparatus 10 creates the image file 30 in which the image data 32 and the tint block data 34 are stored in the different layers or the image file 30a in which the image data 32 and the tint block data 34 are stored in the same layer, depending on whether the delivery destination user 24 is the registered user or not. Thus, when the delivery destination user 24 is the registered user, only the image data 32 can be retrieved from the image file 30 and edited. Meanwhile, when the delivery destination user 24 is not the registered user, since the image data 32 and the tint block data 34 are stored in the same layer 40, the image data 32 cannot be retrieved alone and edited. Thus, the delivery destination user who can treat only the image data 32 is limited.

In addition, although it is determined whether the image data 32 and the tint block data 34 are stored in the different layers or the image data 32 and the tint block data 34 are stored in the same layer, depending on whether the delivery destination 24 is the previously registered user or not in the above, the present invention is not limited to this. For example, when a delivery destination address is in the company, the image data 32 and the tint block data 34 may be stored in the different layers and when it is outside the company, the image data 32 and the tint block data 34 may be stored in the same layer. Alternatively, it may be determined whether the image data 32 and the tint block data 34 are stored in the different layers or in the same layer, depending on information of a delivery destination address. In addition, the delivery destination is not limited to the user 24 connected to the network 20, and it may be a BOX such as a hard disk in the image processing apparatus 10, for example.

Figure 3:
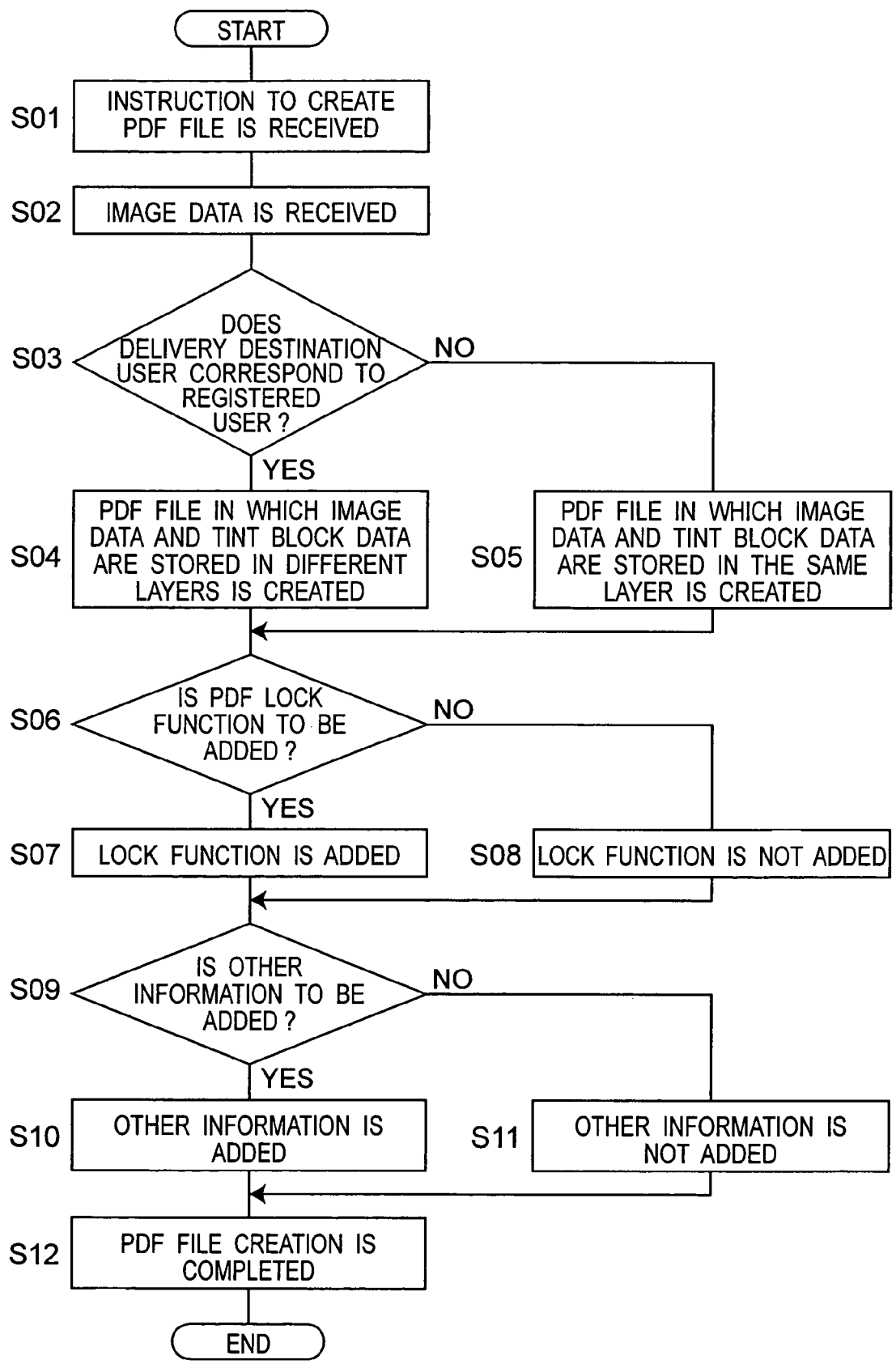
FIG. 3 is a flowchart of an image processing method according to the embodiment 1 of the present invention.

FIG. 3 is a flowchart of an image processing method.

(a) An instruction to create the PDF file and an instruction to deliver the created image file to the user 24 is received from the user 22 at S01.

(b) Image data is received at S02. This image data may be a scan image which is scanned in the image processing apparatus 10, for example. Alternatively, it may be image data which is previously transmitted to the image processing apparatus 10 through the network.

(c) It is determined whether the delivery destination user 24 is corresponding to the registered user or not at S03. Users who can retrieve the image data 32 only and edit it are previously registered in the user registration unit 11. For example, users who can access the image processing apparatus 10 through the network 20 may be registered. Alternatively, not only in such a case, a registered user may be set when the image file is created.

Figure 4:
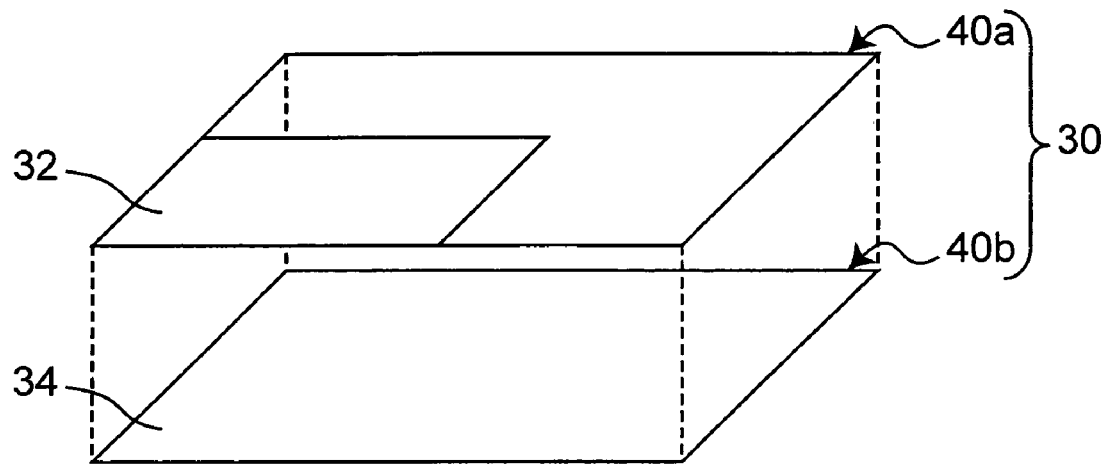
FIG. 4 is a conceptual view showing a layer structure of an image file in which image data and tint block data are stored in the different layers.

(d) When the delivery destination user 24 is the registered user, the PDF file in which the image data and the tint block data are stored in the different layers is created at S04. FIG. 4 is a conceptual view showing a layer structure of the image file 30 in which the image data 32 and the tint block data 34 are stored in the different layers 40a and 40b, respectively. As shown in FIG. 4, since the image data 32 and the tint block data 34 are stored in the different layers 40a and 40b, respectively in the created PDF file, only the image data 32 can be retrieved and edited.

Figure 5:
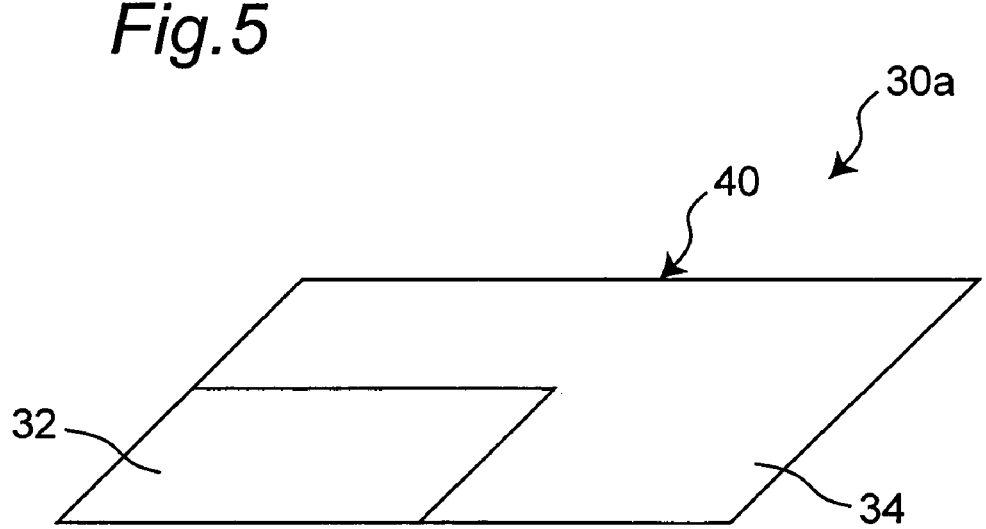
FIG. 5 is a conceptual view showing a layer structure of an image file in which the image data and the tint block data are stored in the same layer.

(e) Meanwhile, when the delivery destination user 24 is not the registered user, the PDF file in which superimposed data of the image data and the tint block data is stored in the same layer is created at S05. FIG. 5 is a conceptual view showing a layer structure of the image file 30a in which the superimposed data of the image data 32 and the tint block data 34 is stored in the same layer 40. As shown in FIG. 5, since the superimposed data of the image data 32 and the tint block data 34 is stored in the same layer 40 in the created PDF file, the image data cannot be retrieved alone and edited.

(f) It is determined whether there is an instruction to add the PDF lock function or not at S06. When the instruction is given, the lock function is added at S07 and when the instruction is not given, the lock function is not added at S08. The lock function can be added by setting a password.

(g) It is determined whether there is an instruction to add other information or not at S09. When the instruction is given, the other information is added at S10, and when the instruction is not given, the other information is not added at S11. In addition, the other information may be an electronic watermark which defines copyright notice, editing authority and the like. The electronic watermark may define a user who has the authority to edit or print only the image data. It can be determined whether the user has the authority to edit only the image data or not, or whether the user has the authority to print only the image data or not, by examining the electronic watermark.

(h) Thus, creation of the PDF file is completed at S12.

Figure 6:
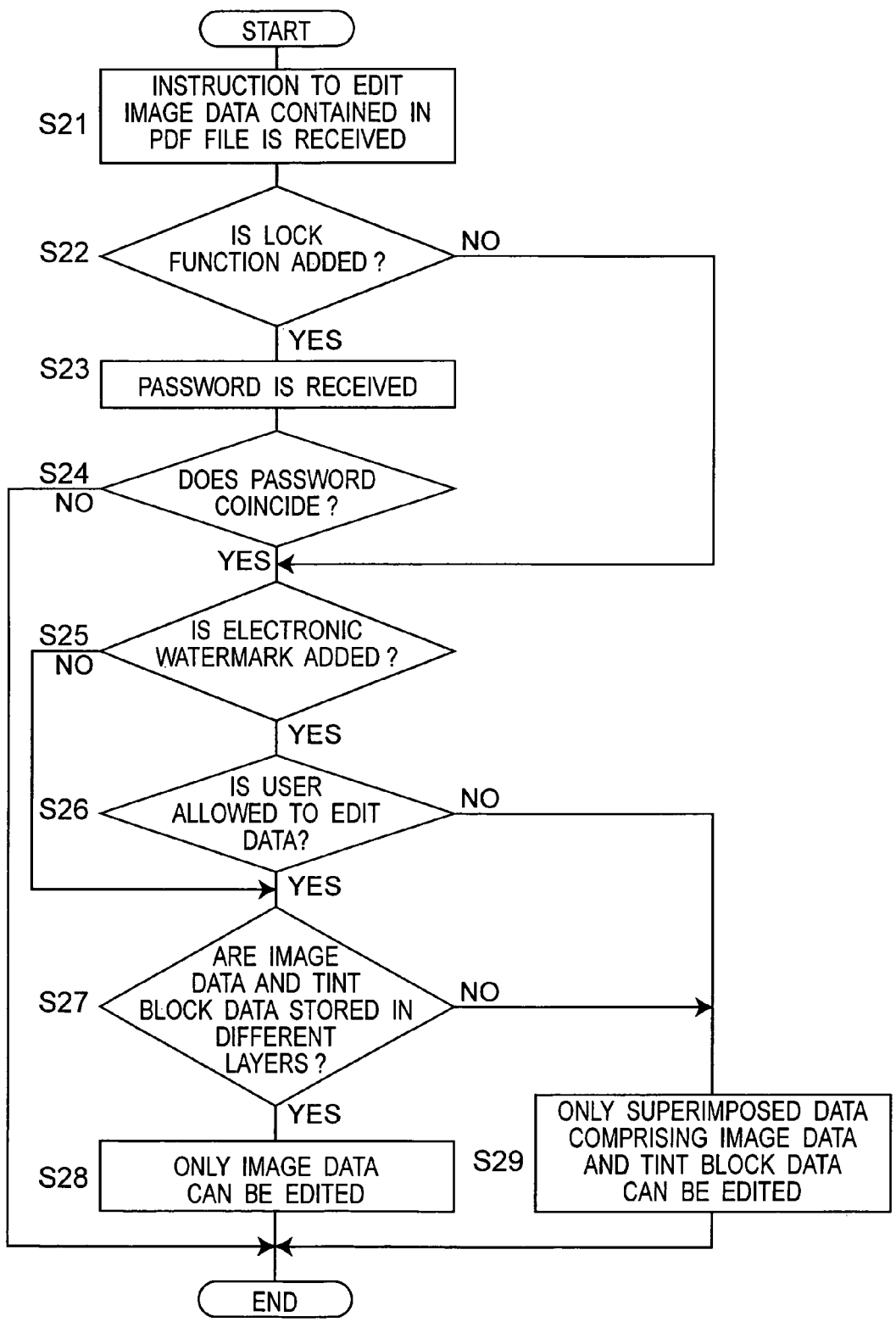
FIG. 6 is an example of a flowchart in a case an instruction to edit only the image data from the image file in which the image data and the tint block data are stored in the different layers or in the same layer is given.

FIG. 6 is an example of a flowchart in a case where there is given an instruction to edit only the image data 32 from the image file 30 in which the image data 32 and the tint block data 34 are stored in the different layers 40a and 40b, respectively, or the image file 30a in which they are stored in the same layer 40.

(a) The instruction to edit the image data 32 contained in the PDF file 30 is received at S21.

(b) It is determined whether the lock function is added to the PDF file 30 or not at S22. When the lock function is not added, a step S23 in which a password is received and a step S24 in which the password is confirmed are skipped and the operation is moved to a step S25.

(c) When the lock function is added to the PDF file 30, the password is received at S23.

(d) It is determined whether the inputted password coincides with the previously set password or not at S24. When it is, the operation is moved to the step S25 and when it is not, the operation is completed. In addition, not only the case where the operation is completed by just one input, the password may be requested again.

(e) It is determined whether the electronic watermark is added or not at S25. When it is not, the operation is moved to a step S27.

(f) When the electronic watermark is added, it is determined whether the user has the authority to edit only the image data 32 or not at S26. When the user has that authority, the operation is moved to the step S27 and when the user does not have that authority, the operation is moved to a step S29.

(g) It is determined whether the image data and the tint block data are stored in the different layers or not at S25.

(h) When the image data and the tint block data are stored in the different layers (YES), only the image data 32 can be edited at S28. Meanwhile, when the image data 32 and the tint block data 34 are stored in the same layer 40 (NO), only the superimposed data in which the image data 32 and the tint block data 34 are superimposed can be edited at S29.

Figure 7:
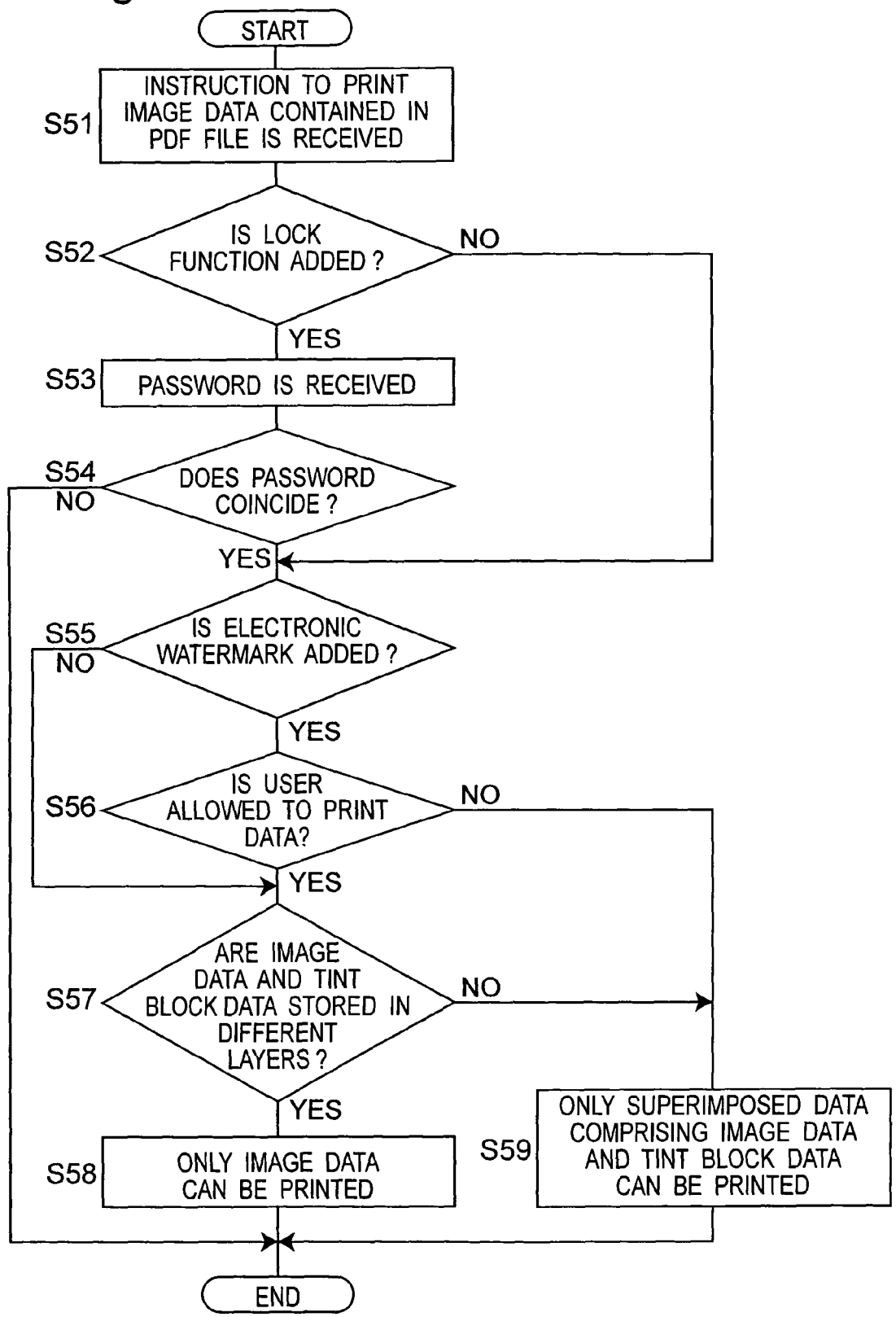
FIG. 7 is an example of a flowchart in a case an instruction to print only the image data from the image file in which the image data and the tint block data are stored in the different layers or in the same layer is given.

FIG. 7 is an example of a flowchart in a case where there is given an instruction to print only the image data 32 from the image file 30 in which the image data 32 and the tint block data 34 are stored in the different layers 40a and 40b, respectively or the image file 30a in which they are stored in the same layer 40. When the instruction to print the image file 30 or the image file 30a is given, although there is provided a mode in which all of the layers are overlapped and printed in general, a mode in which a designated layer is printed can be selected. A description will be made of the case where the instruction to print only the layer containing the image data 32 is given.

(a) The instruction to print the image data 32 contained in the PDF file 30 is received at S51.

(b) It is determined whether the lock function is added to the PDF file 30 or not at S52. When the lock function is not added, a step S53 in which the password is received and a step S54 in which the password is confirmed are skipped and the operation is moved to a step S55.

(c) When the lock function is added to the PDF file 30, the password is received at S53.

(d) It is determined whether the inputted password coincides with the previously set password or not at S54. When it is, the operation is moved to the step S55 and when it is not, the operation is completed. In addition, not only the case where the operation is completed by just one input, the password may be inputted again.

(e) It is determined whether the electronic watermark is added or not at S55. When it is not, the operation is moved to a step S57.

(f) When the electronic watermark is added, it is determined whether the user has the authority to print only the image data 32 or not at S56. When the user has that authority, the operation is moved to the step S57 and when the user does not have that authority, the operation is moved to a step S59.

(g) It is determined whether the image data and the tint block data are stored in the different layers or not at S55.

(h) When the image data and the tint block data are stored in the different layers (YES), only the image data 32 can be printed at S58. Meanwhile, when the image data 32 and the tint block data 34 are stored in the same layer 40 (NO), only the superimposed data in which the image data 32 and the tint block data 34 are superimposed can be printed at S59.

Embodiment 2

Figure 8:
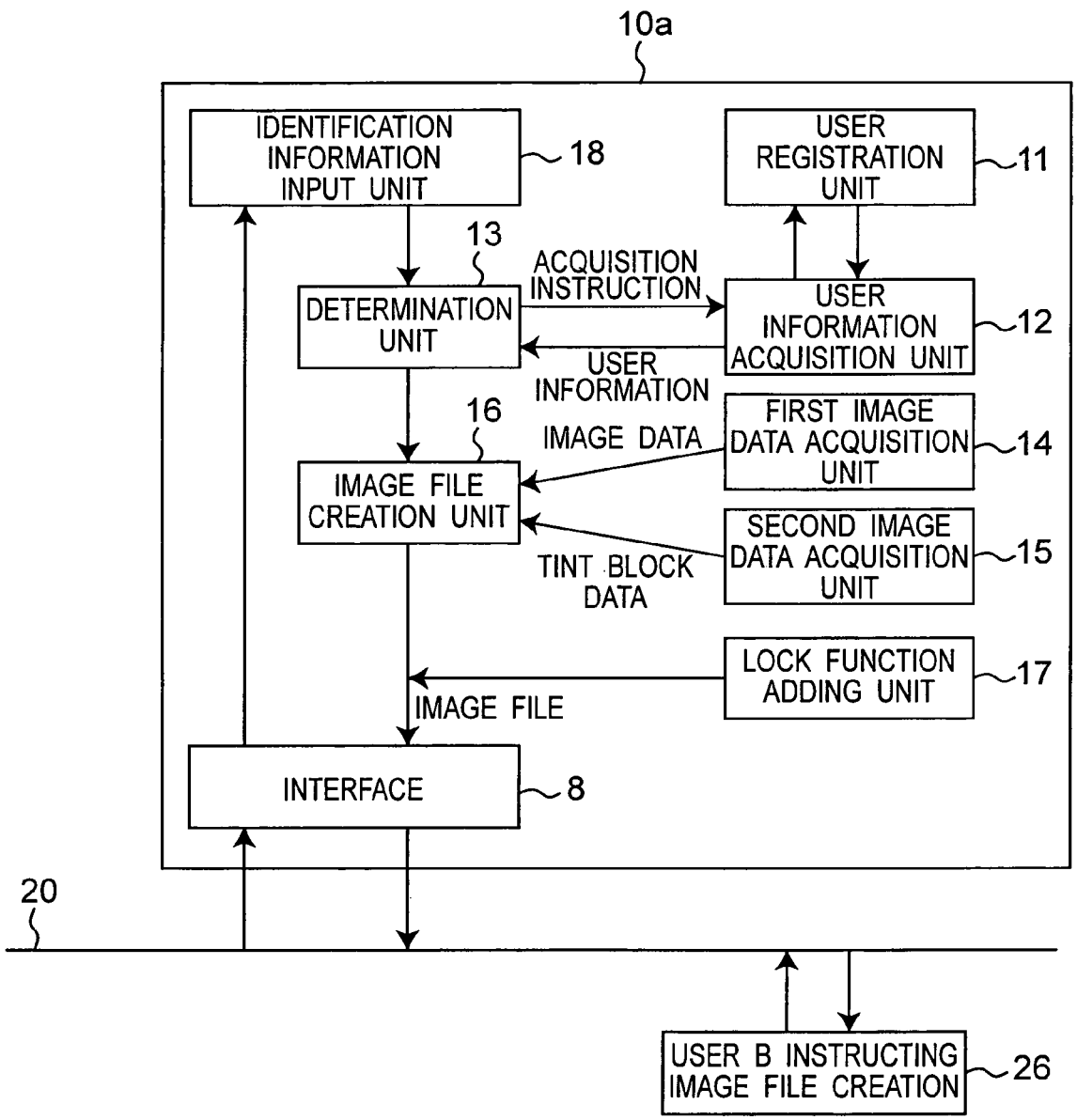
FIG. 8 is a block diagram showing a functional constitution of an image processing apparatus according to an embodiment 2 of the present invention.

FIG. 8 is a block diagram showing a functional constitution of an image processing apparatus 10a according to an embodiment 2 of the present invention. The image processing apparatus 10a is different from the image processing apparatus according to the embodiment 1, in that when a user 26 instructs the image processing apparatus to create an image file through a network 20, an identification information input unit 18 in which identification information of the user B 26 is inputted is provided and a determination unit 13 determines whether the user B 26 is the registered user or not. The image processing apparatus 10a creates image files 30 and 30a in which the image data 32 and tint block data 34 are stored in the different layers and stored in the same layer, respectively, depending on whether the user 26 who gave the instruction to create the image file through the network 20 is a registered user or not. Thus, when the user 26 is the registered user, only the image data 32 retrieved from the image file 30 and edited. Meanwhile, when the user 26 is not the registered user, since the image data 32 and the tint block data 34 are stored in the same layer 40, the image data 32 cannot be retrieved alone and edited. Thus, the user who can treat only the image data 32 is limited.

Figure 9:
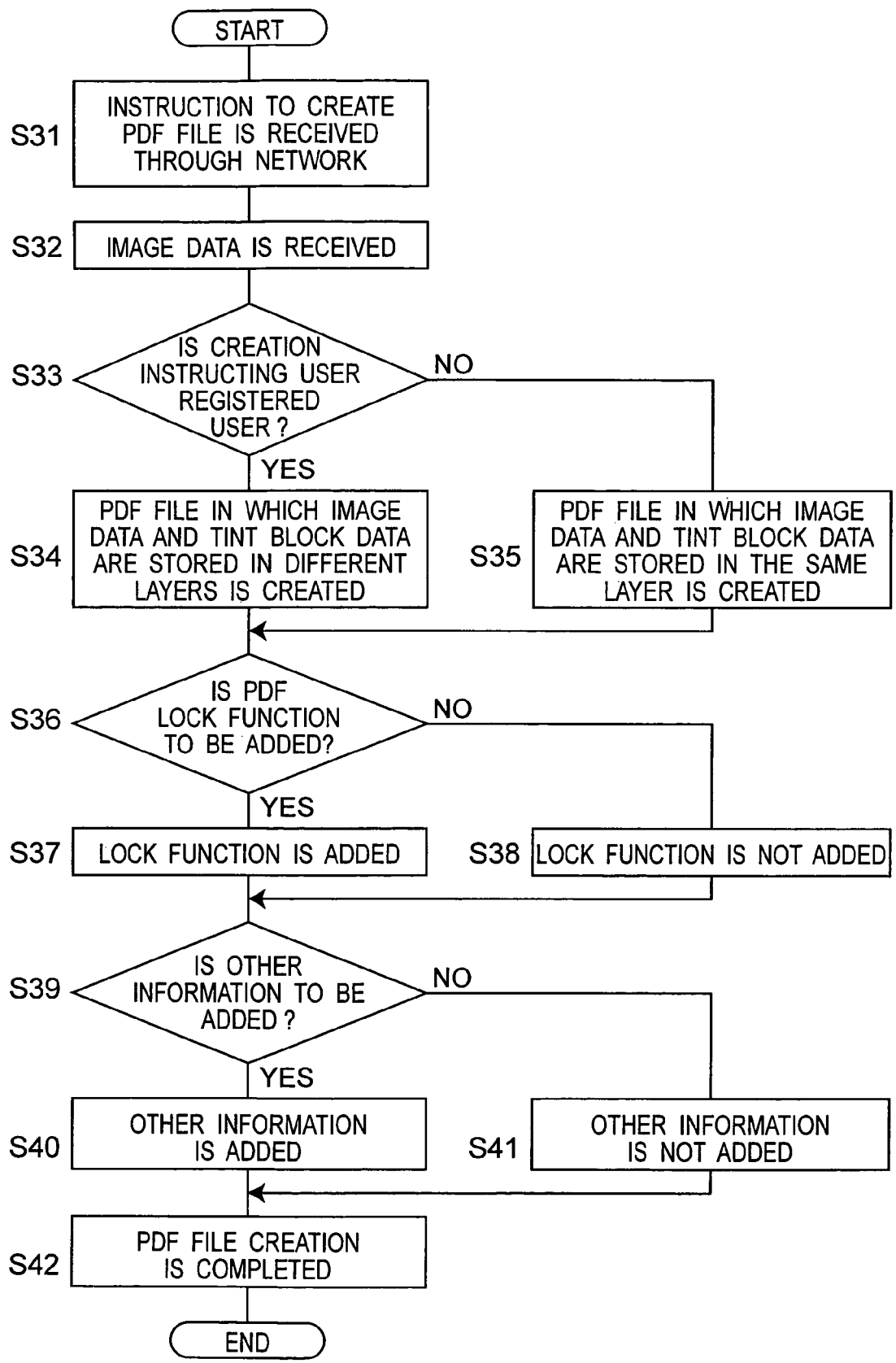
FIG. 9 is a flowchart of an image processing method according to the embodiment 2 of the present invention.

FIG. 9 is a flowchart of this image processing method. This method is different from the image processing method according to the embodiment 1 in that the image file in which the image data and the tint block data are stored in the different layers or they are stored in the same layer is created depending on whether the user B 26 who gave the instruction to create the image file through the network 20 is the registered user or not. A description will be made of this image processing method hereinafter.

(a) The instruction to create the PDF file is received through the network 20 at S31.

(b) Image data is received at S32.

(c) It is determined whether the user 26 who gave the instruction is the registered user or not at S33.

(d) When the user 26 is the registered user, the PDF file in which the image data and the tint block data are stored in the different layers is created at S34.

(e) Meanwhile, when the user 26 is not the registered user, the PDF file in which the image data and the tint block data are stored in the same layer is created at S35.

(f) It is determined whether there is an instruction to add the PDF lock function or not at S36. When the instruction is given, the lock function is added at S37 and when the instruction is not given, the lock function is not added at S38.

(g) It is determined whether there is an instruction to add other information or not at S39. When the instruction is given, the other information is added at S40, and when the instruction is not given, the other information is not added at S41.

(h) Thus, creation of the PDF file is completed at S42.

On the above embodiments 1 and 2, the tint block data can be acquired from HDD 4 which stores the tint block data, and data storage devices of external information processing apparatus connected via the network. The tint block data can be formed in the image forming apparatus before superimpose. In this case, the tint block data can be formed based on a plurality of information, for example, by executing tint block data forming program in the image forming apparatus. It is noted that the tint block data may be automatically formed depending on the user who orders to form, the image data, the species of the image data, and/or delivery destination. Also, the user who orders to form may select the tint block data from stored tint block data which include plurality of species, for example, "unable to copy" and "copy protected".

The image processing apparatus according to the present invention can be used as the MFP which creates the image file such as the PDF file comprising the layer management function.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. An image processing apparatus which creates and delivers an image file whose layer can be managed, comprising:
    a first image data acquisition unit which acquires first image data;
    a second image data acquisition unit which acquires second image data;
    receiving unit for receiving a delivery destination of the created image file;
    a determination unit which determines whether the first image data and the second image data are to be stored in the same layer or the different layers, depending on the delivery destination received by the receiving unit;
    an image file creation unit which creates the image file in which the first image data and the second image data are stored in the same layer or the different layers, based on a result of the determination of the determination unit; and
    transmitting unit for transmitting the image file to the delivery destination received by the receiving unit.

2. The image processing apparatus according to claim 1, wherein the determination unit determines whether the first image data and the second image data are stored in the same layer or in the different layers, depending on whether a user of the delivery destination received by the receiving unit is registered or not.

3. An image processing apparatus which creates and delivers an image file whose layer can be managed, comprising:
    a first image data acquisition unit which acquires first image data;
    a second image data acquisition unit which acquires second image data;
    a determination unit which identifies a user who gave an instruction to create the image file to acquire an identification information of the user, and determines whether the first image data and the second image data are to be stored in the same layer or the different layers, depending on the identification information of the user; and
    an image file creation unit which creates the image file in which the first image data and the second image data are stored in the same layer or the different layers, based on a result of the determination of the determination unit.

4. The image processing apparatus according to claim 3, wherein the image processing apparatus further comprises an identification information input unit in which the identification information of the user who gives the instruction to create the image file is inputted, and
    the determination unit determines whether the first image data and the second image data are stored in the same layer or the different layers, depending on whether the identification information inputted from the identification information input unit is user-registered or not.

5. The image processing apparatus according to claim 1, wherein the second image data is tint block data.

6. The image processing apparatus according to claim 1, wherein the image file is a PDF file.

7. An image processing method by which an image file whose layer can be managed is created and delivered, comprising:
    acquiring first image data;
    acquiring second image data;
    receiving a delivery destination of the created image file;
    determining whether the first image data and the second image data are to be stored in the same layer or the different layers, depending on the delivery destination received by the receiving unit;
    creating the image file in which the first image data and the second image data are stored in the same layer or the different layers, based on a result of the determination; and
    transmitting the image file to the delivery destination received by the receiving unit.

8. The image processing method according to claim 7, wherein in the course of the determining step, it is determined whether the first image data and the second image data are to be stored in the same layer or in the different layers, depending on whether a user of the delivery destination received by the receiving unit is registered or not.

9. The image processing method according to claim 7, wherein the second image data is tint block data.

10. The image processing method according to claim 7, wherein the image file is a PDF file.

11. An image processing method by which an image file whose layer can be managed is created and delivered, comprising:
    acquiring first image data;
    acquiring second image data;
    identifying a user who gave an instruction to create the image file to acquire an identification information of the user, and determining whether the first image data and the second image data are to be stored in the same layer or the different layers, depending on the identification information of the user; and creating the image file in which the first image data and the second image data are stored in the same layer or the different layers, based on a result of the determination of the determination unit.

12. The image processing method according to claim 11, wherein in the course of the determining step, it is determined whether the first image data and the second image data are stored in the same layer or the different layers, depending on whether the identification information of the user who gives the instruction to create the image file is user-registered or not.

13. The image processing method according to claim 11, wherein the second image data is tint block data.

14. The image processing method according to claim 11, wherein the image file is a PDF file.

15. A non-transitory computer readable medium encoded with a computer executable image processing program for causing a computer to execute each step of the image processing method by which an image file whose layer can be managed is created and delivered, comprising:

acquiring first image data;

acquiring second image data;

receiving a delivery destination of the created image file;

determining whether the first image data and the second image data are to be stored in the same layer or the different layers, depending on the delivery destination received by the receiving unit;

creating the image file in which the first image data and the second image data are stored in the same layer or the different layers, based on a result of the determination; and transmitting the image file to the delivery destination received by the receiving unit.

16. The computer readable medium according to claim 15, wherein in the course of the determining step, it is determined whether the first image data and the second image data are to be stored in the same layer or in the different layers, depending on whether a user of the delivery destination received by the receiving unit is registered or not.

17. A non-transitory computer readable medium encoded with a computer executable image processing program for causing a computer to execute each step of the image processing method by which an image file whose layer can be managed is created and delivered, comprising:

acquiring first image data;

acquiring second image data;

identifying a user who gave an instruction to create the image file to acquire an identification information of the user, and determining whether the first image data and the second image data are to be stored in the same layer or the different layers, depending on the identification information of the user; and creating the image file in which the first image data and the second image data are stored in the same layer or the different layers, based on a result of the determination of the determination unit.

18. The computer readable medium according to claim 17, wherein in the course of the determining step, it is determined whether the first image data and the second image data are to be stored in the same layer or the different layers, depending on whether the identification information of the user who gives the instruction to create the image file is user-registered or not.

* * * * *